April 16, 1968  G. M. ROSENBERRY, JR  3,378,754
VOLTAGE REGULATOR WITH INVERTING CAPABILITY
Filed Dec. 21, 1965  2 Sheets-Sheet 1

INVENTOR.
GEORGE M. ROSENBERRY, JR.
BY
HIS ATTORNEY

April 16, 1968   G. M. ROSENBERRY, JR   3,378,754
VOLTAGE REGULATOR WITH INVERTING CAPABILITY
Filed Dec. 21, 1965   2 Sheets-Sheet 2

INVENTOR.
GEORGE M. ROSENBERRY, JR.
BY James C. Davis Jr.
HIS ATTORNEY

United States Patent Office 3,378,754
Patented Apr. 16, 1968

3,378,754
VOLTAGE REGULATOR WITH INVERTING CAPABILITY
George M. Rosenberry, Jr., Schenectady, N.Y., assignor to General Electric Company, a corporation of New York
Filed Dec. 21, 1965, Ser. No. 515,436
13 Claims. (Cl. 322—28)

This invention relates to excitation controllers for dynamoelectric machine systems and, more particularly pertains to systems of this type wherein the field excitation power supply has inverting capabilities.

The field excitation controller disclosed in my prior patent application Ser. No. 325,041, filed on Nov. 20, 1963, now Patent No. 3,289,071, and assigned to the same assignee as the present invention, is a static type particularly useful in maintaining the output voltage of a generator at a predetermined constant value, for example. The excitation controller constructed in accordance with that invention is connected between generator output terminals to an exciter, or directly to a generator field winding. Circuits are provided which maintain a sensed voltage representative of the output voltage of the generator and then match this sensed voltage against a reference voltage to obtain a difference, an error, signal proportional to the amount by which the reference voltage differs from the sensed voltage. This error signal energizes a firing circuit to fire a controlled rectifier, for example, thereby applying excitation power to the exciter or generator field winding in an amount sufficient to maintain a constant voltage output at the generator output terminals.

It has been found that this kind of voltage regulator works well in maintaining a constant output voltage when loads are applied to the generator. If at this time a decrease in the output voltage of the generator is sensed, a proportional error signal is obtained, and power is applied to the exciter or generator field winding in proportion to the decrease in the output voltage level. However, when a heavy load is removed quickly from the generator, the output voltage of the generator increases beyond the predetermined constant value which the voltage regulator is to maintain. Excitation controllers of the type described feature half-wave rectified outputs and cannot apply a negative voltage to the exciter or generator field winding when the voltage overshoots because a free-wheeling rectifier, which is connected across the exciter or generator field winding to protect against the adverse effects of induced voltage therein and permit half-wave energization, shorts any negative voltage which might possibly be applied to the field winding. When the output voltage of the generator increases in this manner due to sudden unloading, the voltage regulator merely applies no excitation power to the exciter or generator field winding. Therefore, the transient response of generator systems of this type is generally slow for an overvoltage condition in comparison with their rapid response to an undervoltage condition.

Therefore, it is an object of this invention to provide a dynamoelectric machine excitation control system of the kind described having an improved capability of responding to an overvoltage generator condition.

It is another object of this invention to provide an alternating-current generator system of the kind described having a more rapid speed of corrective response when the generated voltage overshoots a predetermined voltage level.

It is still another object of this invention to provide an improved half-wave excitation controller capable of correcting for both undervoltage conditions and overvoltage conditions with equal facility.

Briefly stated, I provide an excitation controller that energizes the field winding of a dynamoelectric machine, or intermediate exciter, with alternate half cycles of variable duration from a source of alternating-current and, in accordance with this invention, the controller is adapted to return power from the field to the source in an inverting mode to reduce more rapidly the magnitude of excitation when required. The source can be the output terminals when the machine is an alternating-current generator, for example.

In accordance with one more detailed aspect of this invention, an excitation controller is provided with a first means for controllably supplying power from an A-C generator to the generator field winding to control the magnitude of the output voltage. This first means includes first and second controllable conducting means connected in circuit with the field winding and with voltage terminals of the generator by some coupling means. These coupling means are so arranged that the first and second controllable conducting means are alternately forward and reverse biased by the generator output voltage, each being biased oppositely from the other at any time. A firing circuit for the voltage regulator includes means for generating a firing pulse for the controllable conducting means during each half-cycle of the generated output voltage such that the excitation regulator can operate in an inverting mode when an overvoltage condition occurs in the generated output voltage, thereby rapidly dissipating energy from the field to provide a corresponding improvement in response under such conditions.

While the specification concludes with claims particularly pointing out and distinctly claiming the subject matter which is regarded as this invention, it is believed that this invention will be better understood from the following description taken in connection with the accompanying drawings in which:

Figure 1:
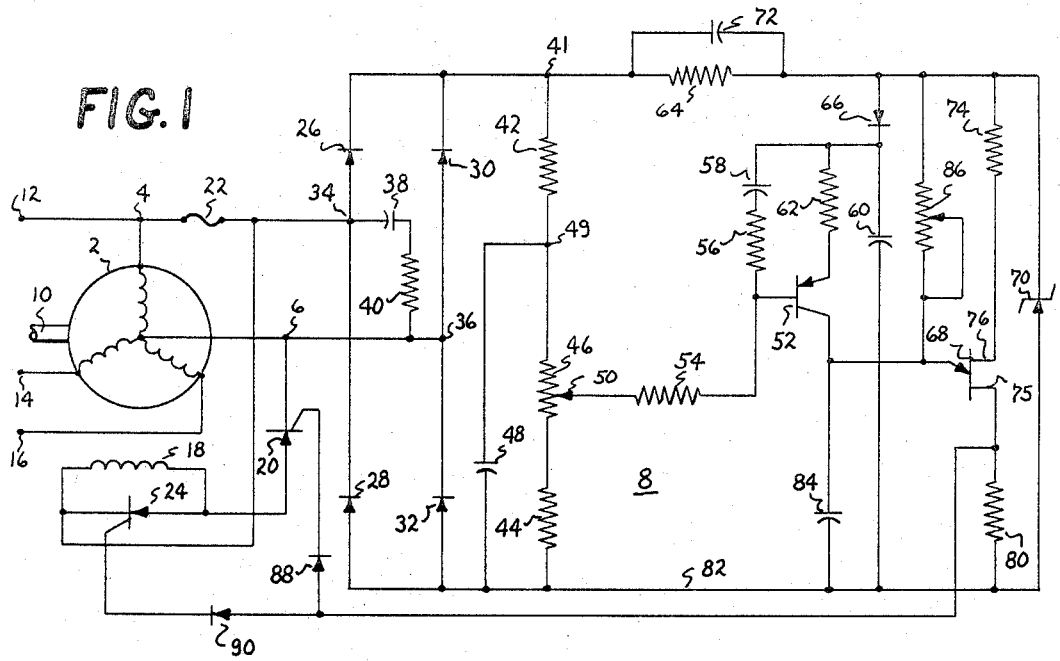
FIGURE 1 is a schematic diagram of a voltage regulated alternating-current power generation system which illustrates one embodiment of this invention.

The alternating-current generator system shown in FIGURE 1 comprises a three-phase dynamoelectric generator 2 having a pair of terminals 4 and 6 to which are connected an excitation controller having a voltage regulator 8. The generator 2 is powered by means of a motive power system which rotates a generator shaft 10 coupled to its armature. The output voltage of the generator 2 is coupled from terminals 12, 14 and 16 to a load device for the generator system. The frequency of the output voltage coupled from the terminals 12, 14 and 16 varies with the speed of rotation of the shaft 10, while the output voltage magnitude is dependent upon the corresponding energization of an exciter or generator field winding 18. The voltage regulator 8 controls the magnitude of the generated voltage by varying the magnitude of excitation power supplied to field winding 18.

The voltage regulator circuit 8 controls the amount of power which is coupled from the terminals 4 and 6 to the field winding 18. This power is coupled from the neutral terminal 6 and through a controlled rectifier 20 to one side of the field winding 18 and from the line terminal 4 through a circuit protective fuse 22 of the other side of the field winding. A second controlled rectifier 24 is coupled across the field winding 18 in a manner similar to that of coupling the usual free-wheeling diode across a field winding. As will be more fully explained below, the fact that a controllable circuit element is coupled across the field winding to operate in conjunction with the silicon-controlled rectifier 20 during each half-cycle of the generated voltage is instrumental in allowing the voltage regulator circuit 8 to assume an inverting mode of operation when an overvoltage is generated by the generator 2.

A sensing circuit for the voltage regulator circuit 8 includes a full-wave bridge rectifier circuit comprising rectifiers 26, 28, 30 and 32. One side of the fuse 22 is coupled to a junction point 34 between the rectifiers 26 and 28, while the terminal 6 is coupled to a junction point 36 between the rectifiers 30 and 32. An RC circuit comprising a capacitor 38 and a resistor 40 is coupled between the junction points 34 and 36 to form an added current path during a portion of each half-cycle of the generated voltage for firing current for the silicon-controlled rectifiers 20 and 24.

The bridge rectifier circuit is coupled through a junction point 41 to a voltage divider comprising the resistors 42 and 44 and a potentiometer 46 and the capacitance 48 to filter the voltage thereacross when necessary. The values of the voltage divider components are chosen to provide a voltage level at a slidewire 50 of the potentiometer 46 which is within the operating voltage range of the other components of the voltage regulator circuit 8. The voltage at the slidewire 50 is held at a constant level by the circuit 8.

The sensed voltage at the slidewire 46 is fed through a stabilizing network to a transistor 52. The stabilizing network includes a resistor 54 connected between the slidewire 50 and the base electrode of the transistor 52. One function of the resistor 54 is to protect the transistor 52 from transient voltage surges at the slidewire 50 which might damage this transistor. The resistor 54 further comprises a portion of a lag network which also includes a resistor 56 and a capacitor 58. This lag network provides a high gain, stable system for the operation of the transistor 40.

A reference voltage is developed across a capacitor 60, by means of Zener diode 70, and is coupled through a resistor 62 to the emitter electrode of the transistor 52. Current flows from the bridge rectifier and through a resistor 64 and a diode 66 to charge the capacitor 60.

The resistor 64 also couples current to an oscillator circuit which includes the unijunction transistor 68 and comprises a firing circuit for the silicon-controlled rectifiers 20 and 24. The voltage at the anode of the diode 66 is maintained at a constant voltage level by a Zener diode 70 connected across the firing circuit. To provide an added current path for firing current for the silicon-controlled rectifiers 20 and 24, a capacitor 72 is coupled across the resistor 64. The Zener voltage of the Zener diode 70 is coupled through a resistor 74 to the base two electrode 76 of the unijunction transistor 68. The base one electrode 78 is coupled through a resistor 80 to a common bus 82. A capacitor 84 is connected between the emitter electrode of the unijunction transistor 68 and the common bus 82 to serve as a timing capacitor for the unijunction transistor oscillator. That is, the capacitor 84 is charged, as by current from the transistor 52, until the voltage thereacross reaches the stand-off voltage: a certain fraction of the voltage applied across the base two electrode 76 and the base one electrode 78. At this time the impedance between the emitter and the base one electrode decreases substantially to discharge the capacitor 84 through the resistor 80.

A resistance 86 that is conveniently variable, as shown, is connected between the cathode electrode of the Zener diode 70 and the emitter electrode of the unijunction transistor 68 to provide a charging path for the capacitor 84 even though the transistor 52 is turned off. The current flow through this charging path develops a voltage across the capacitor 84. The impedance of the resistance 86 is such that the developed voltage fires the unijunction transistor 68 during a latter portion of each half-cycle of the sinusoidal generator voltage, as the base two-base one voltage maintained by the Zener diode 70 begins to decrease below the Zener voltage level, even in the absence of current flowing from the transistor 52, thereby establishing a base, or reference firing point even in the absence of a demand indicated by the state of the sensed condition, i.e., generated voltage. Firing current for the controlled rectifiers 20 and 24 is coupled from the base one electrode 78 and through the diodes 88 and 90, respectively.

During the operation of the alternating-current generator system shown in FIG. 1, output voltage is coupled to a load (not shown) from the terminals 12, 14 and 16. The voltage across the terminals 4 and 6 is coupled to the voltage regulator circuit 8. During a half-cycle of the generated voltage when the terminal 4 is positive in polarity with respect to the terminal 6, the rectifier 26 couples current to the resistors 42 and 44 and the potentiometer 46 and through the resistor 64 to the reference voltage and firing circuits. The rectifier 32 provides a return path for this current from the common bus 82 to the neutral terminal 6.

To provide a measure of the generator output voltage, the voltage developed at the slidewire 50 is coupled through the resistor 54 to the base electrode of the transistor 52. Furthermore, the reference voltage developed at the capacitor 60 is coupled through the resistor 62 to the emitter electrode of the transistor 52. The transistor 52 in effect compares the voltage at the slidewire 50 with the reference voltage at the capacitor 60 and charges the capacitor 84 in proportion to any undervoltage sensed at the slidewire 50. That is, when the voltage at its base electrode is less than that at its emitter electrode, the transistor 52 is forward biased. The impedance between its emitter and collector electrodes decreases in proportion to this forward bias, and the capacitor 84 is charged at an increased rate proportional to the decrease in the collector-emitter impedance.

When the sensed voltage at the slidewire 50 is equal to or greater than the reference voltage at the capacitor 60, the transistor 52 does not conduct current. However, the resistance 86 also provides a charging current path for the capacitor 84. The impedance of this rheostat is such that current flow therethrough charges the capacitor 84 to the firing, or stand-off, voltage of the unijunction transistor 68 near the end of a half-cycle of the generator output voltage. Whenever the stand-off voltage level is reached, the impedance between the emitter and base one electrodes of the unijunction transistor 68 decreases appreciably and a firing pulse is coupled from the base one electrode 78 to the diodes 88 and 90. It has been found advantageous to include the capacitors 38 and 72 in the voltage regulator circuit 80 to store a charge prior to the transistor 68's conducting so as to increase the firing current coupled from the base one electrode 78 and through the diodes 88 and 90 to the controlled rectifiers 20 and 24. The resistor 40 which is in series with the capacitor 38 is used as a damping resistor.

It will be assumed that current was flowing through a field winding 18 prior to this half-cycle of the generator voltage when the terminal 4 is positive in polarity with respect to the terminal 6. The controlled rectifier 24 was free wheeling current generated by an induced voltage in the field winding 18 and continues to do so until the controlled rectifier 20 is fired. When an undervoltage is generated by the generator 2 a firing pulse is coupled through the diode 88 and the gate electrode of the silicon-controlled rectifier 20 to fire this controlled rectifier early in the half-cycle when it is forward biased. Through a process of commutation, the current flow through the field winding 18 now switches from the controlled rectifier 24 to the controlled rectifier 20. Therefore, the field winding 18 is excited by the generator voltage and the level of the generated voltage increases.

When an overvoltage is generated by the generator 2, a current pulse from the unijunction transistor 68 does not fire the controlled rectifier 20 until near the end of this half-cycle of the generated voltage. The controlled rectifier 20 must be fired before the next half-cycle of the generated voltage or the controlled rectifier 24 will continue to conduct through the next half-cycle and cause a further overvoltage. The controlled rectifier 20 must be fired before the end of this half-cycle when it is forward biased or it will not turn on. It must be fired as close to the end of this half-cycle as possible so that it couples very little energy from the generator armature to energize the field winding 18. Actually the angle at which the silicon-controlled recefier 20 must be fired is somewhat governed by the commutation angle of the circuit, that is, the minimum time required for the field current to transfer from the controlled rectifier 24 to the controlled rectifier 20 after a firing pulse has been coupled to the latter controlled rectifier. After the controlled rectifier 20 has been fired, it continues to conduct during the succeeding half-cycle of the generated voltage, when the terminal 4 is negative in polarity with respect to the terminal 6, due to the electrical inertia, or inductance, of the induced voltage in the field winding 18 which tends to keep a steady current flow in this winding. The controlled rectifier 20 is operating in an inverting mode since a negative voltage which causes the generated voltage to decrease is coupled to the field winding 18.

During the succeeding half cycle when the potential at the terminal 4 is negative in polarity with respect to that at the terminal 6, the rectifiers 28 and 30 couple current to the voltage regulator circuit 8. The circuit operation is the same as that described above with respect to the previous half-cycle, except that when the unijunction transistor 68 conducts, a firing pulse turns on silicon-controlled rectifier 24 and a process of commutation turns off the controlled rectifier 20. If an undervoltage is sensed at the slidewire 50, the controlled rectifier 24 is turned on earlier in this half-cycle. If an overvoltage is sensed a firing pulse turns on the controlled rectifier 24 later in this half-cycle, due to the charging of the capacitor 84 by the rheostat 85, so as to decrease the magnitude of the generated voltage in accordance with this invention.

Figure 2:
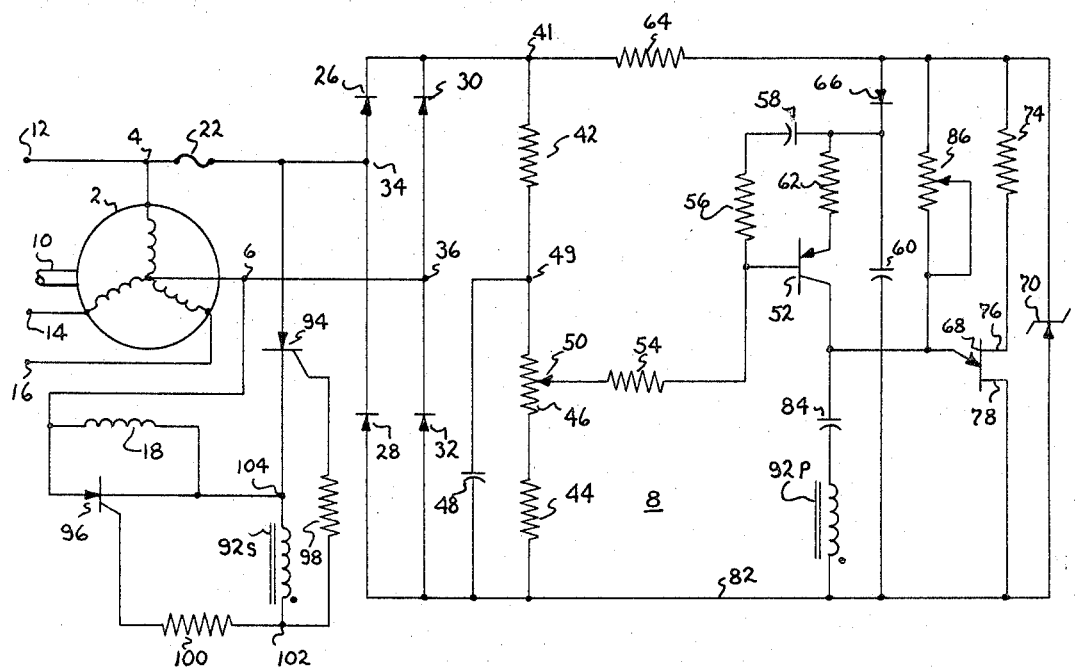
FIGURE 2 is a schematic diagram of a voltage regulated alternating-current power generation system depicting a second embodiment of this invention.

The circuit shown in FIG. 2 is a modified form of the alternating-current voltage regulator system described with respect to FIG. 1. One basic difference in this circuit is that a pulse transformer is used to couple firing pulses to a pair of controlled rectifiers. Similar circuit components in FIGS. 1 and 2 are marked with the same numerals.

The circuit shown in FIG. 2 comprises a pulse transformer 92 having a primary winding 92P connected between the capacitor 84 and the common bus 82. A secondary winding 92S of the transformer 92 is connected in circuit with a pair of controlled rectifiers 94 and 96. The controlled rectifier 94 is connected between the junction point 34 and one side of the generated field winding 18, and the controlled rectifier 96 is connected across this field winding. A pair of resistors 98 and 100 is connected between the gate electrodes of the controlled rectifiers 94 and 96. The secondary winding 92S is connected between a junction point 102 between the resistors 98 and 100 and a junction point 104 between the cathode electrodes of the controlled rectifiers 94 and 96.

The circuit shown in FIG. 2 operates in a manner similar to that shown in FIG. 1. Thus, during either half-cycle of the generator output voltage the capacitor 84 is charged to the stand-off voltage of the unijunction transistor 68 by current coupled through the transistor 52 and/or the rheostat 85. After this voltage has been reached, the capacitor 84 discharges through the emitter-base one circuit of the unijunction transistor 68 and through the primary winding 92P to generate a voltage in this winding which is positive in polarity at its dot end. This voltage is induced in the secondary winding 92S where it causes a current flow through the resistors 98 and 100 that tends to turn on the one of the controlled rectifiers 94 and 96 which is forward biased by a voltage generated by the generators 2. Through a process of commutation the current flow through the field winding 18 now switches from the controlled rectifier which is presently reverse biased by the output voltage of the generator 2 to the forward biased controlled rectifier. As was noted above with respect to FIG. 1, either of the controlled rectifiers which controls the current flow through the field winding 18 continues to conduct during the half-cycle after it is forward biased because the field winding 18 has a voltage induced therein tending to maintain the current flow through this winding. Thus, the voltage regulator 8 is able to operate in an inverting mode by firing the controlled rectifiers 94 and 96 late in a half-cycle when each is forward biased by the output voltage from the generator 2.

Figure 3:
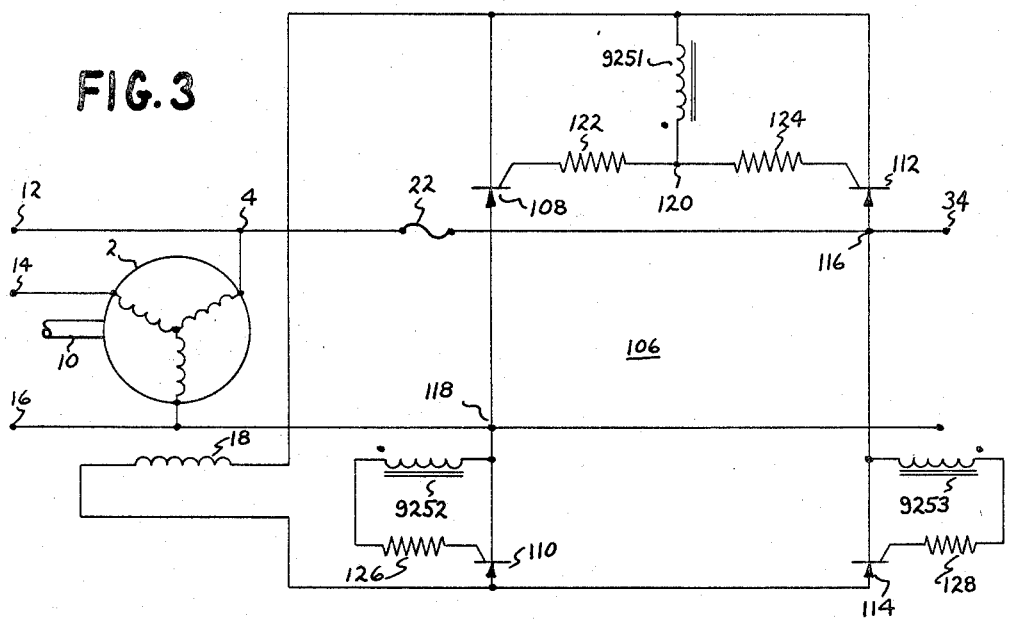
FIGURE 3 is a schematic diagram showing a portion of a power generation system utilizing a full-wave bridge circuit for energizing a generator field winding.
Figure 4:
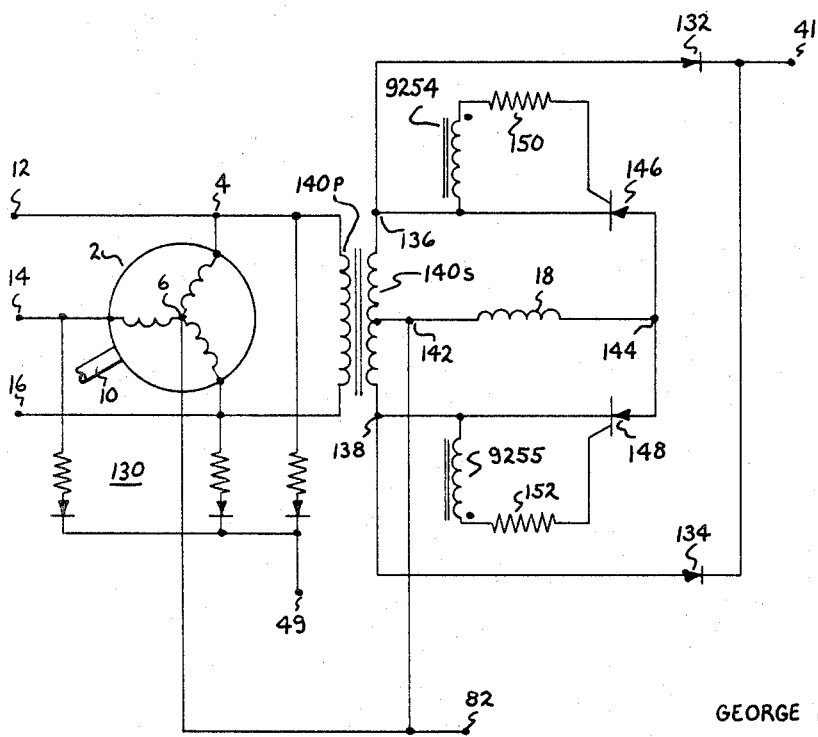
FIGURE 4 is a schematic diagram showing a portion of a power generation system utilizing a full-wave center tap circuit for energizing a generator field winding.

The circuits shown in FIG. 3 and FIG. 4 are modifications of that described with respect to FIG. 2. Circuit components in these figures which are common with FIG. 2 are marked with similar numerals.

FIG. 3 shows a partial schematic diagram of a portion of a power generation system which utilizes a full-wave bridge circuit 106 for controlling the energization of the field winding 18. In the bridge circuit 106 two pairs of controlled rectifiers 108, 110 and 112, 114 are connected in parallel across the field winding 18. The resistor 22 is coupled to a junction point 116 between the controlled rectifiers 112 and 114, while the output terminal 16 is coupled to a junction point 118 between the controlled rectifiers 108 and 110. In the gate circuits of the controlled rectifiers 108 and 112, a secondary winding 92S1 of the pulse transformer 92 is connected between the cathodes of the controlled rectifiers 108 and 112 and a junction point 120. Furthermore, resistors 122 and 124 are connected between the junction point 120 and the gate electrodes of the controlled rectifiers 108 and 112, respectively.

The controlled rectifiers 110 and 114 have separate but similar firing circuits. In the firing circuit for the controlled rectifier 110, a secondary winding 92S2 of the transformer 92 is coupled from the cathode of this controlled rectifier and through a resistor 126 to the gate electrode thereof. Similarly, a secondary winding 92S3 is coupled from the cathode electrode of the controlled rectifier 114 and through a resistor 128 to its gate electrode.

During a cycle of the output voltage when the junction point 116 is positive in polarity with respect to the junction point 118, the controlled rectifiers 110 and 112 are forward biased by the generator output voltage. However, these controlled rectifiers cannot conduct current until current flow through their gate electrodes turns them on. Assuming that the generator 2 was operating in accordance with this invention prior to this half-cycle, the controlled rectifiers 108 and 114 continue to conduct current during the present half-cycle, even though the generated voltage at the junction points 116 and 118 now reverses, because field 18 maintains the previous direction of current flow. When the firing circuit of the voltage regulator 8 generates a firing pulse in the primary winding 92P, see FIG. 2, the pulses induced in the secondary windings 92S1 and 92S2 fire the controlled rectifiers 110 and 112. As explained above with respect to FIGS. 1 and 2, the controlled rectifiers forward biased during each half-cycle of the generator output voltage at the junction points 116 and 118 must be fired before the end of each half-cycle. If they are fired early during the half-cycle, they couple a substantial amount of power to the field winding 18 to energize it, thereby raising the output voltage level of the generator 2. If they are fired near the end of this half-cycle, the controlled rectifiers continue to conduct current during this half-cycle due to the inductive nature of the field winding 18 thereby causing the voltage regulator 8 to operate in its inverting mode.

During a half-cycle of the output voltage when the junction point 118 is positive in polarity with respect to the junction point 116, the controlled rectifiers 108 and 114 are forward biased. Since the controlled rectifiers 110 and 112 were fired during the preceding half-cycle of the generated voltage in accordance with this invention, they continue to conduct until a firing pulse in the primary winding 92P is induced in the secondary windings 92S1 and 92S3 to fire the controlled rectifiers 108 and 114.

Referring to FIG. 4, a schematic diagram is shown depicting a portion of a power generation system which utilizes a full-wave, center tap circuit for controlling the energization of the generator field winding 18. The circuit shown in FIG. 4 also features a three-phase, half-wave sensing voltage supply system 130 which may be substituted for the full-wave, single-phase supply system shown in FIGS. 1 and 2, generally comprising the rectifiers 26, 28, 30 and 32. When the sensing voltage supply system 130 is substituted therefor, a pair of rectifiers 132 and 134 is coupled from terminals 136 and 138, respectively, of a secondary winding 140S of a transformer 140 to the junction point 41. A primary winding 140P of the transformer 140 is coupled across the terminal 4 and the terminal 16. In order to control the energization of the field winding 18, connected between a center tap 142 of the secondary winding 140S and a junction point 144 between the anodes of a pair of controlled rectifiers 146 and 148, the cathodes thereof are coupled to the terminals 136 and 138, respectively. Each of the controlled rectifiers 146 and 148 has a firing circuit comprising a secondary winding of the transformer 92. Referring to the controlled rectifier 146, a secondary winding 92S4 is coupled from its cathode and through a resistor 150 to its gate electrode. The controlled rectifier 148 has a secondary winding 92S5 coupled from its cathode and through a resistor 152 to its gate electrode. The center tap 142 and the neutral terminal 6 are connected to the common bus 82.

The operation of the circuit shown in FIG. 4 is similar to that of the circuits discussed with respect to FIGS. 1–3 in that the controlled rectifiers 146 and 148 are fired during half cycles of the voltage across the secondary winding 140S when they are individually forward biased. Each of these controlled rectifiers then continues to conduct during a subsequent half-cycle of the voltage across the secondary winding 140S when this controlled rectifier is reverse biased, until the other controlled rectifier is fired.

For example, when the terminal 136 is positive in polarity with respect to the terminal 138 the voltage across the terminal 138 and the center tap 142 forward biases the controlled rectifier 148. Assuming that the generator 2 has been operating prior to this half cycle, the controlled rectifier 146 is conducting and remains conducting until a firing pulse is coupled from the primary winding 92P, see FIG. 2, to the secondary winding 92S5. At this time the controlled rectifier 148 begins to conduct to deliver power to the field winding 18, while through a process of commutation the controlled rectifier 146 stops conducting. The controlled rectifier 148 remains conducting during this half-cycle of the voltage across the secondary winding 140S and during the succeeding half-cycle until a pulse in the secondary winding 92S4 turns on the controlled rectifier 146 once again. It can be seen from the above analysis that the voltage regulator 8 operates in its inverting mode, when the circuit shown in FIG. 2 is modified in accordance with the circuit shown in FIG. 4, any time when during a half-cycle of the voltage across the secondary winding 140S, a controlled rectifier is fired later than a quarter cycle after it first becomes forward biased.

This invention is not limited to the particular details of the embodiments illustrated, and it is contemplated that various modifications and applications thereof will occur to those skilled in the art. For example, while electric signals referred to herein and in the appended claims are denoted voltages, it is apparent that the full equivalence thereof in the form of current or other electric parameters is readily substituted through application of the well-known principle of duality or the like. It is therefore intended that the appended claims cover such modifications and adaptations as do not depart from the direct spirit and scope of this invention.

What I claim as new and desire to secure by Letters Patent of the United States is:

1. For use in an alternating-current electric voltage generator system including a generator having a field winding and generator voltage terminals, a voltage regulator for this system comprising:
   (a) sensing circuit means connected to the generator voltage terminals for maintaining a sensed voltage which is a representation of the output voltage level of the generator;
   (b) reference voltage circuit means for establishing a reference voltage level;
   (c) conductive circuit means coupled to said sensing circuit means and said reference voltage circuit means for establishing a difference voltage proportional to the difference between the sensed voltage level and the reference voltage level;
   (d) first means for controllably supplying power from the generator to the field winding to control the magnitude of the output voltage level;
   (e) said first means comprising first and second controllable conducting means and coupling means for interconnecting said first and second controllable conducting means with the field winding and with the voltage terminals, said coupling means being so arranged that said first controllable conducting means is forward biased by one half-cycle of the generator output voltage and said second controllable conducting means is forward biased by the other half-cycle of the generator output voltage;
   (f) a firing circuit interconnecting said conductive circuit means and said first means, said firing circuit comprising second means for generating firing pulses in response to the difference voltage and for coupling the firing pulses to said first and second controllable conducting means;
   (g) said firing circuit means also including third means for compelling said second means to generate a firing pulse near the end of each half-cycle of the generator voltage in the absence of a demand indicated by said difference voltage to cause one of said controllable conducting means to fire during each half-cycle when it is forward biased whereby the voltage regulator has inverting capabilities.

2. A voltage regulator according to claim 1 wherein said coupling means connects said first controllable conducting means across the field winding in such a manner that said first controllable conducting means can act as a free-wheeling device for the field winding.

3. A voltage regulator according to claim 2 wherein said second controllable conducting means is connected between said field winding and one of the generator terminals so that said first means supplies half-wave power to the field winding.

4. A voltage regulator according to claim 1 wherein said second means includes a unijunction transistor which generates a pulse when a storage capacitor is charged to the stand-off voltage level thereof and said third means comprises resistive means adapted to couple current to said transistor to charge the storage capacitor during each half-cycle of the generated voltage.

5. A voltage regulator according to claim 1 including fourth means for coupling direct current developed by said sensing circuit means to said firing circuit means; said fourth means including capacitive means so arranged that it can be charged by each half-cycle of the generated voltage and discharged by the firing circuit to provide firing current for said controllable conducting means.

6. A voltage regulator according to claim 1 wherein said first and second controllable conducting means comprise legs of a full-wave bridge circuit.

7. A voltage regulator according to claim 1 wherein said coupling means comprise a center tap transformer having a primary winding connected to the generator terminals.

8. In an alternating-current electric voltage generator system: a generator having a field winding and generator voltage terminals, a voltage regulator wherein a sensed representation of the output voltage level of the generator is compared to a reference voltage by a conductive circuit for establishing a difference voltage proportional to the amount by which the sensed voltage level exceeds the reference voltage level, the improvement in said regulating voltage comprising:
  (a) first and second controllable conducting means connected to the field winding and the voltage terminals to control the power supplied to the field winding from the generator, means for connecting said first controllable conducting means across the field winding in such a manner that said first controllable conducting means can act as a free-wheeling device for the field winding during one half-cycle of the generator voltage;
  (b) firing circuit means responsive to the difference voltage interconnecting the conducting circuit and said controllable conducting means for firing said controllable conducting means; and
  (c) means for compelling said firing circuit means to fire said controllable conducting means during each half-cycle when they are forward biased whereby the voltage regulator has inverting capabilities.

9. A voltage regulator according to claim 8 wherein said second controllable conducting means is connected between the field winding and one of the generator terminals so that said controllable conducting means supply half-wave power to the field winding.

10. A voltage regulator according to claim 8 wherein said firing circuit means includes a unijunction transistor oscillator which generates a firing pulse when a storage capacitor is charged to the stand-off voltage level thereof and the means for compelling comprises resistive means adapted to couple current to said transistor to charge said storage capacitor during each half-cycle of the generated voltage.

11. A voltage regulator according to claim 8 wherein said first and second controllable conducting means comprise legs of a full-wave bridge circuit.

12. A voltage regulator according to claim 8 including a center tap transformer having a primary winding connected to the generator terminals and a secondary winding having first and second terminals and a center tap, means for connecting said first and second controllable conducting means to said first and second terminals, respectively, and means for connecting the field winding to said center tap to provide the field winding with full-wave excitation current.

13. An excitation controller for a dynamoelectric machine having an inductive field excitation means, said controller comprising:
  (a) a source of alternating-current power;
  (b) means including a first controllable semiconductive device coupling said source to said field excitation means;
  (c) a second controllable semiconductive device shunting said field excitation means; and
  (d) regulator means including a trigger pulse circuit connected to said devices and adapted to render said devices alternately conductive in response to a sensed condition, said trigger pulse circuit providing at least one trigger pulse to said devices during each half-cycle of said source of alternating-current power even in the absence of a demand indicated by the state of said sensed condition.

References Cited
UNITED STATES PATENTS

| | | | |
|---|---|---|---|
| 2,975,352 | 3/1961 | Ford | 320—39 X |
| 3,151,288 | 9/1964 | Avizienis et al. | 322—28 |
| 3,201,679 | 8/1965 | Buchanan et al. | |
| 3,258,678 | 6/1966 | Legatti | 322—73 X |

JOHN F. COUCH, *Primary Examiner.*

H. HUBERFELD, *Assistant Examiner.*